(12) United States Patent
Howell

(10) Patent No.: US 6,621,815 B1
(45) Date of Patent: Sep. 16, 2003

(54) COMMUNICATION INTERFACE SYSTEM

(75) Inventor: Royal Dean Howell, Trimble, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/442,659

(22) Filed: Nov. 18, 1999

(51) Int. Cl.[7] .............................................. H04Q 11/00
(52) U.S. Cl. ...................... 370/385; 370/410; 379/230; 379/229; 379/207.02
(58) Field of Search ................................ 379/230, 229, 379/207.02; 370/352, 385, 410

(56) References Cited

U.S. PATENT DOCUMENTS

| | | | |
|---|---|---|---|
| 5,825,780 A | 10/1998 | Christie | 370/522 |
| 5,991,301 A | 11/1999 | Christie | 370/395.71 |
| 6,031,840 A | 2/2000 | Christie | 370/410 |
| 6,181,703 B1 | 1/2001 | Christie et al. | 370/410 |
| 6,226,289 B1 * | 5/2001 | Williams et al. | 370/381 |

* cited by examiner

Primary Examiner—Ahmad F. Matar
Assistant Examiner—Karen Le

(57) ABSTRACT

A communications interface system receives an initial address message for a call into a circuit process and transferring the initial address message to a call process. The call process processes the initial address message to generate and transfer set-up information to a bearer system. The bearer system receives user communications for the call and routes the user communications in response to the set-up information. The circuit process receives a release message for a call and transfers the release message to the call process. The call process processes the release message to generate and transfer tear-down information and a disconnect message. The circuit process generates and transfers a release complete message in response to the disconnect message. The bearer system terminates the routing of the user communications in the in response to the tear-down information.

14 Claims, 10 Drawing Sheets

FIG. 1 — PRIOR ART

COMMUNICATION INTERFACE SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a communication systems that process calls.

2. Description of the Prior Art

FIGS. 1–2 illustrate a conventional communication interface system that is known in the prior art. FIG. 1 depicts call system 100, communication interface system 111, packet system 114, and signaling system 115. The call system 100 and the signaling system 115 exchange signaling over link 125. The signaling system 115 and the interface system 111 exchange signaling over link 128. The call system 100 and the interface system 111 exchange user communications over communication path 120. The interface system 111 and the packet system 114 exchange the user communications over communication path 132. In some cases, the call system 100 and the interface system 111 exchange signaling over the communication path 120. Some examples of signaling are Signaling System #7 (SS7) and C7. Some examples are of communication paths are Time Division Multiplex (TDM), Internet Protocol (IP), and Asynchronous Transfer Mode (ATM). Some examples of user communications are voice and data.

The communication interface system 111 comprises originating circuit process 112, terminating circuit process 113, call process 114, and bearer system 115. The originating circuit process 112 is associated with the communications path 120. The originating circuit process 112 exchanges signaling with the call system 100 through the signaling system 115. The originating circuit process 112 handles maintenance signaling and forwards call-related signaling to the call process 114. The terminating circuit process 113 is associated with the communications path 132. The terminating circuit process 113 exchanges signaling with the terminating end of the call (not shown) through the signaling system 115. The terminating circuit process 112 handles maintenance signaling and forwards call-related signaling to the call process 114. The call process 114 exchanges the call-related signaling with both of the circuit processes 112–113. The call process 114 validates, routes, and bills the call. The call process 114 provides control signals to the bearer system 115. The bearer system 115 receives and routes the user communications between the call system 100 and the packet system 115 in response to the control signals.

FIG. 2 is a message sequence chart that depicts the operation of the systems 100, 111, 114, and 115. To set-up a call, the call system 100 transfers an Initial Address Message (IAM) to the signaling system 115. The signaling system 115 transfers the IAM to the interface system 111. The interface system 111 processes the IAM to route the call. The interface system 111 transfers an IAM to the signaling system 115 for delivery to systems at the terminating end of the call. The signaling system 115 transfers an Address Complete Message (ACM) to the interface system 111. The ACM indicates that the called party is being alerted (assuming they are not busy). The interface system 111 processes the ACM and transfers an ACM to the signaling system 115. The signaling system 115 transfers the ACM to the call system 100. The signaling system 115 transfers an Answer Message (ANM) to the interface system 111. The ANM indicates that the called party has answered the call. The interface system 111 processes the ANM and transfers an ANM to the signaling system 115. The signaling system 115 transfers the ANM to the call system 100. The call system 100 exchanges the user communications with the interface system 111. The interface system 111 exchanges the user communications with the packet system 114 for delivery to systems at the terminating end of the call. To end the call, the call system 100 transfers a Release Message (REL) to the signaling system 115. The signaling system 115 transfers the REL to the interface system 111, and the interface system 111 transfers a Release Complete Message (RLC) to the signaling system 115. The signaling system 115 transfers the RLC to the call system 100. The interface system 111 transfers an REL to the signaling system 115 for delivery to systems at the terminating end of the call. The above-described message processing is well known.

Unfortunately, the call process 114 must handle all of the call-related messaging, including the RLC. Thus, instead of using its capacity for additional calls, the call process 114 uses capacity to wait for the RLC at the end of the call. Techniques and systems are needed to increase processing capacity for additional calls.

SUMMARY OF THE INVENTION

The invention solves the above problems with a communications interface system that moves RLC processing from the call process to the circuit process. Advantageously, race conditions are avoided because the circuit process stamps the messages for a call with a serial number that is checked by the call process.

The communications interface system receives an initial address message for a call into a circuit process and transfers the initial address message to a call process. The call process processes the initial address message to generate and transfer set-up information to a bearer system. The bearer system receives user communications for the call and routes the user communications in response to the set-up information. The circuit process receives a release message for a call and transfers the release message to the call process. The call process processes the release message to generate and transfer tear-down information and a disconnect message. The circuit process generates and transfers a release complete message in response to the disconnect message. The bearer system terminates the routing of the user communications in the in response to the tear-down information.

BRIEF DESCRIPTION OF THE DRAWINGS

The same reference number represents the same element on all drawings.

DETAILED DESCRIPTION OF THE PREFERRED EMBODIMENT

Communication Interface System—FIGS. 3–7

Figure 1:
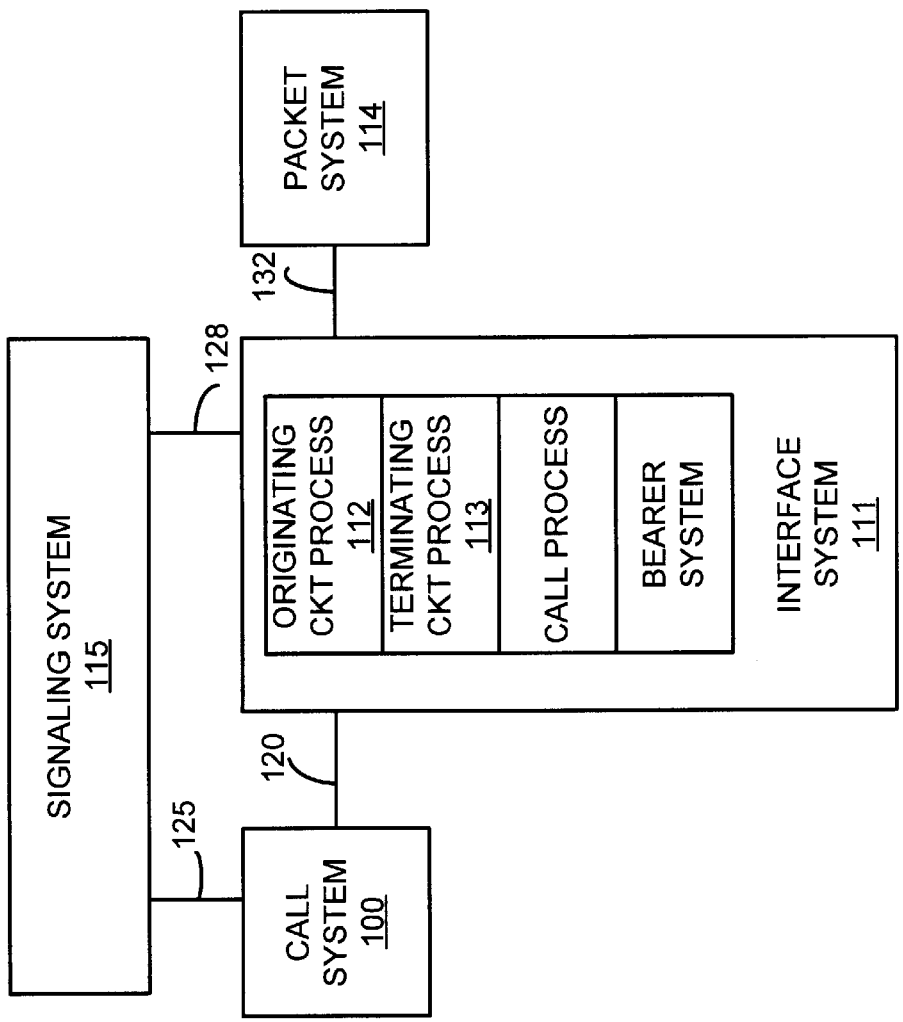
FIG. 1 is a block diagram that depicts a communication interface system and operating environment in the prior art.
Figure 2:
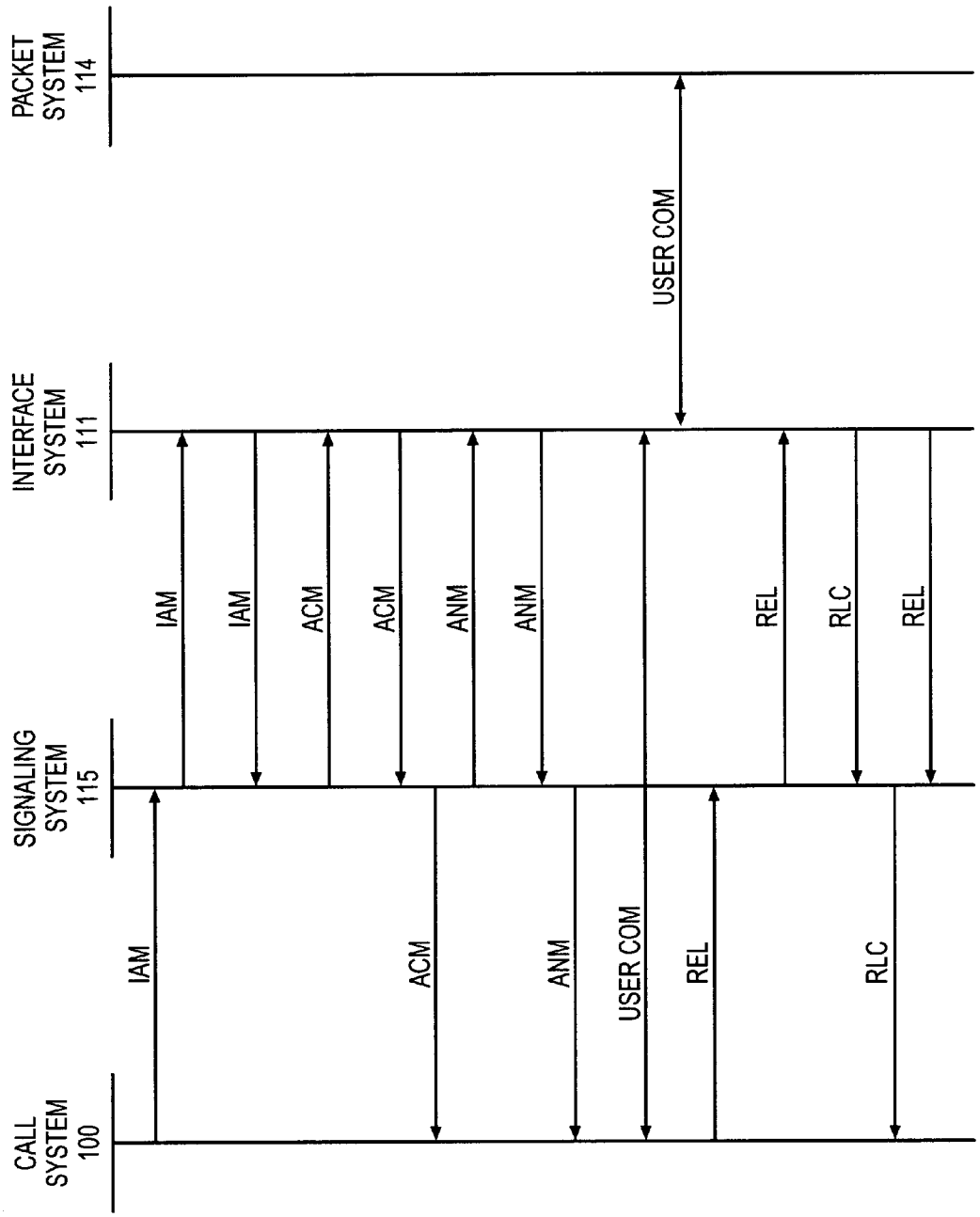
FIG. 2 is a message sequence chart that depicts the operation of the communication interface system and operating environment in the prior art.
Figure 3:
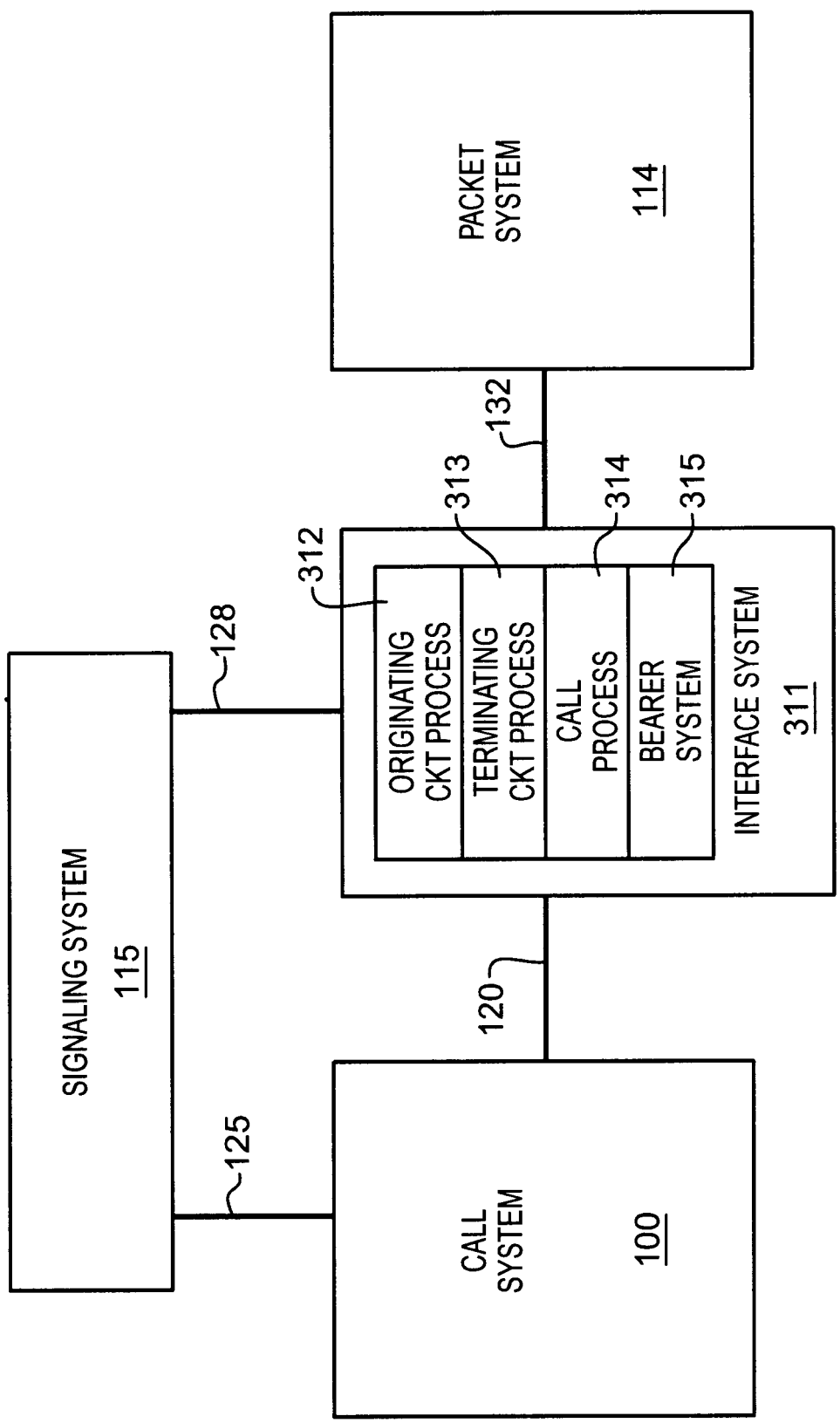
FIG. 3 is a block diagram that depicts a communication interface system and operating environment in an example of the invention.

FIG. 3 depicts the call system 100, the packet system 114, and the signaling system 115 from FIG. 1, along with their associated links and communications paths. A novel communication interface system 311 is shown coupling the systems 100, 114, and 115. The call system 100 and the signaling system 115 exchange signaling over the link 125. The signaling system 115 and the interface system 311 exchange signaling over the link 128. The call system 100 and the interface system 311 exchange the user communications over the communication path 120. The interface system 311 and the packet system 114 exchange the user communications over the communication path 132. In alternative embodiments of the invention, the call system 100 and the interface system 311 exchange signaling over the communication path 120. Some examples of signaling are SS7 and C7. Some examples are of communication paths are TDM, IP, and ATM. Some examples of user communications are voice and data. Aside from the interface system 311, the configuration and operation of the systems, links, and communications paths could be conventional.

The communication interface system 311 comprises an originating circuit process 312, terminating circuit process 313, call process 314, and bearer system 315. The originating circuit process 312 is associated with the communications path 120. The originating circuit process 312 exchanges signaling with the call system 100 through the signaling system 115. The originating circuit process 312 handles maintenance signaling. The originating circuit process 312 handles RLC signaling, but forwards other call-related signaling to the call process 314. The terminating circuit process 313 is associated with the communications path 132. The terminating circuit process 313 exchanges signaling with terminating end of the call (not shown) through the signaling system 115. The terminating circuit process 312 handles maintenance signaling. The terminating circuit process 312 handles RLC signaling, but forwards other call-related signaling to the call process 314. The call process exchanges the call-related signaling with both of the circuit processes 312–313. The call process 314 validates, routes, and bills the call. The call process 314 provides control signals to the bearer system 315. The bearer system 315 receives and routes the user communications between the call system 100 and the packet system 115 in response to the control signals.

Figure 4:
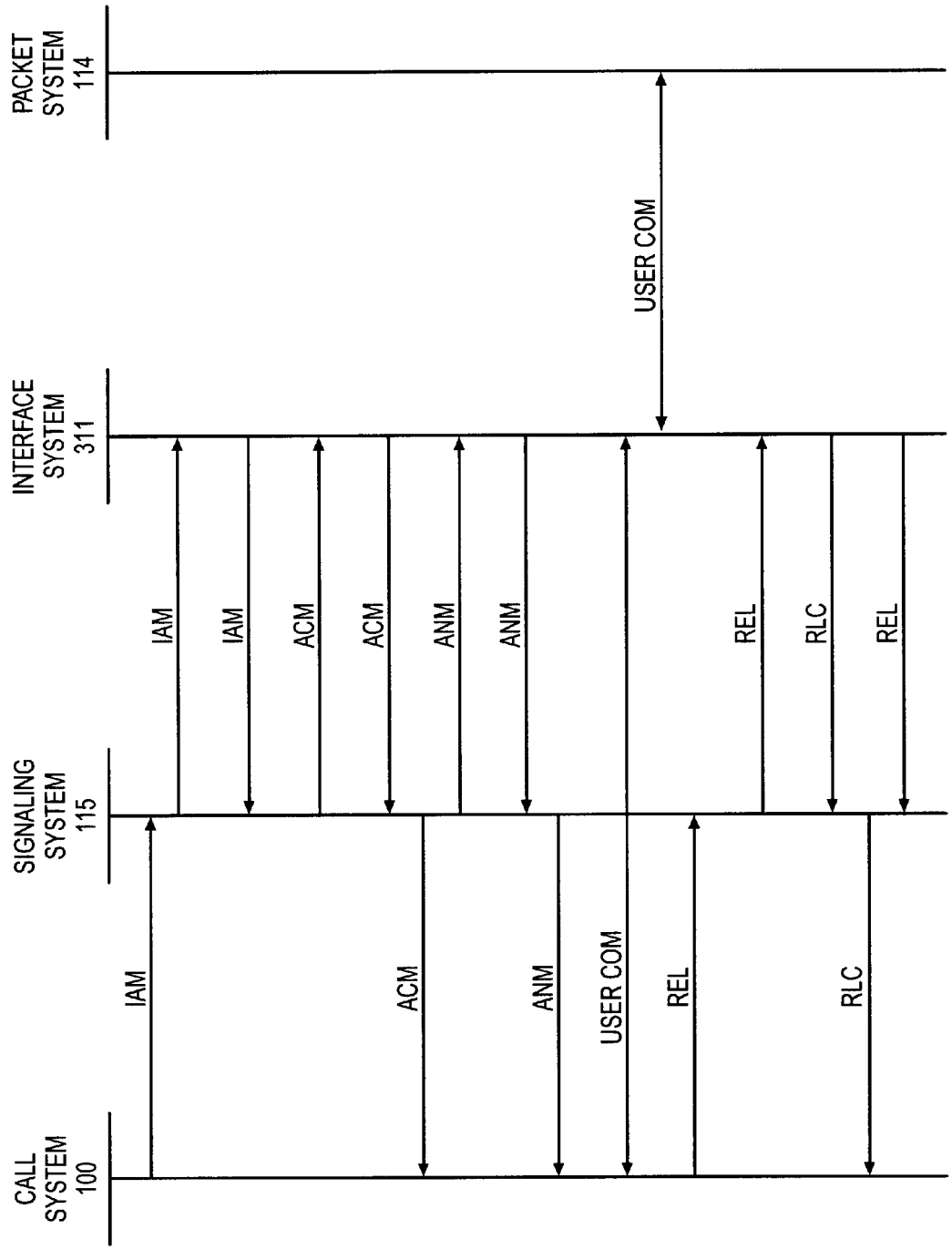
FIG. 4 is a message sequence chart that depicts the operation of the communication interface system and operating environment in an example of the invention.

FIG. 4 is a message sequence chart that depicts the operation of the systems 100, 311, 114, and 115. To set-up a call, the call system 100 transfers an IAM to the signaling system 115. The signaling system 115 transfers the IAM to the interface system 311. The interface system 311 processes the IAM to route the call. The interface system 311 transfers an IAM to the signaling system 115 for delivery to systems at the terminating end of the call. The signaling system 115 transfers an ACM to the interface system 311. The ACM indicates that the called party is being alerted (assuming they are not busy). The interface system 311 processes the ACM and transfers an ACM to the signaling system 115. The signaling system 115 transfers the ACM to the call system 100. The signaling system 115 transfers an ANM to the interface system 311. The ANM indicates that the called party has answered the call. The interface system 311 processes the ANM and transfers an ANM to the signaling system 115. The signaling system 115 transfers the ANM to the call system 100. The call system 100 exchanges the user communications with the interface system 311. The interface system exchanges the user communications with the packet system 114 for delivery to systems at the terminating end of the call. To end the call, the call system 100 transfers an REL to the signaling system 115. The signaling system 115 transfers the REL to the interface system 311, and the interface system 311 transfers an RLC to the signaling system 115. The signaling system 115 transfers the RLC to the call system 100. The interface system 311 transfers an REL to the signaling system 115 for delivery to systems at the terminating end of the call.

Figure 5:
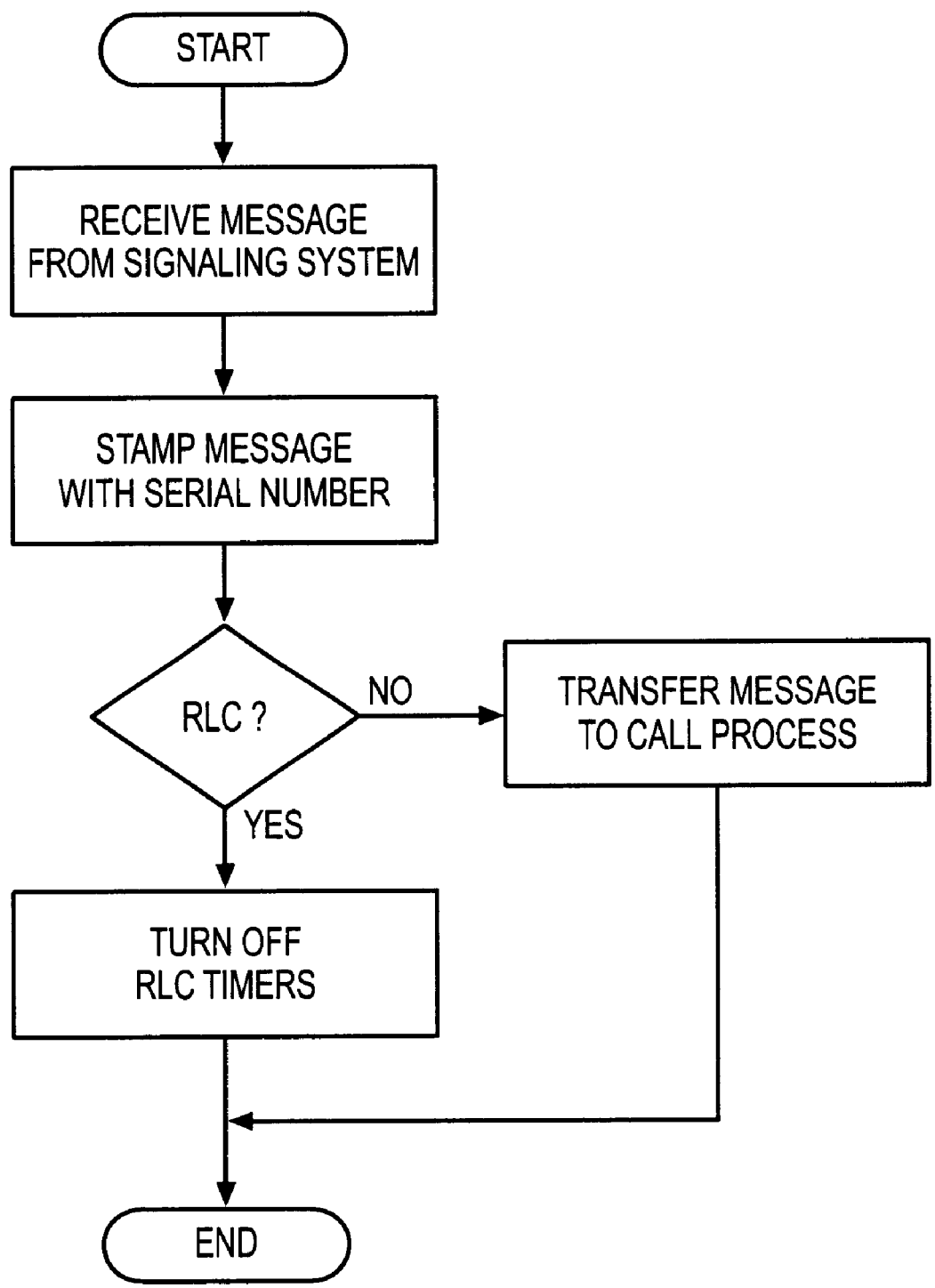
FIG. 5 is a flow chart that depicts the operation of the originating circuit process in an example of the invention.

FIG. 5 depicts the operation of the circuit process 312 when processing a call related message, such as an IAM, ACM, ANM, REL, or RLC. The circuit process 312 receives a call-related message from the signaling system 115 and stamps the message with a serial number. If the message is not an RLC, then the circuit process 312 transfers the message to the call process 314. If the message is an RLC, then the circuit process 312 turns off the RLC timers.

Figure 6:
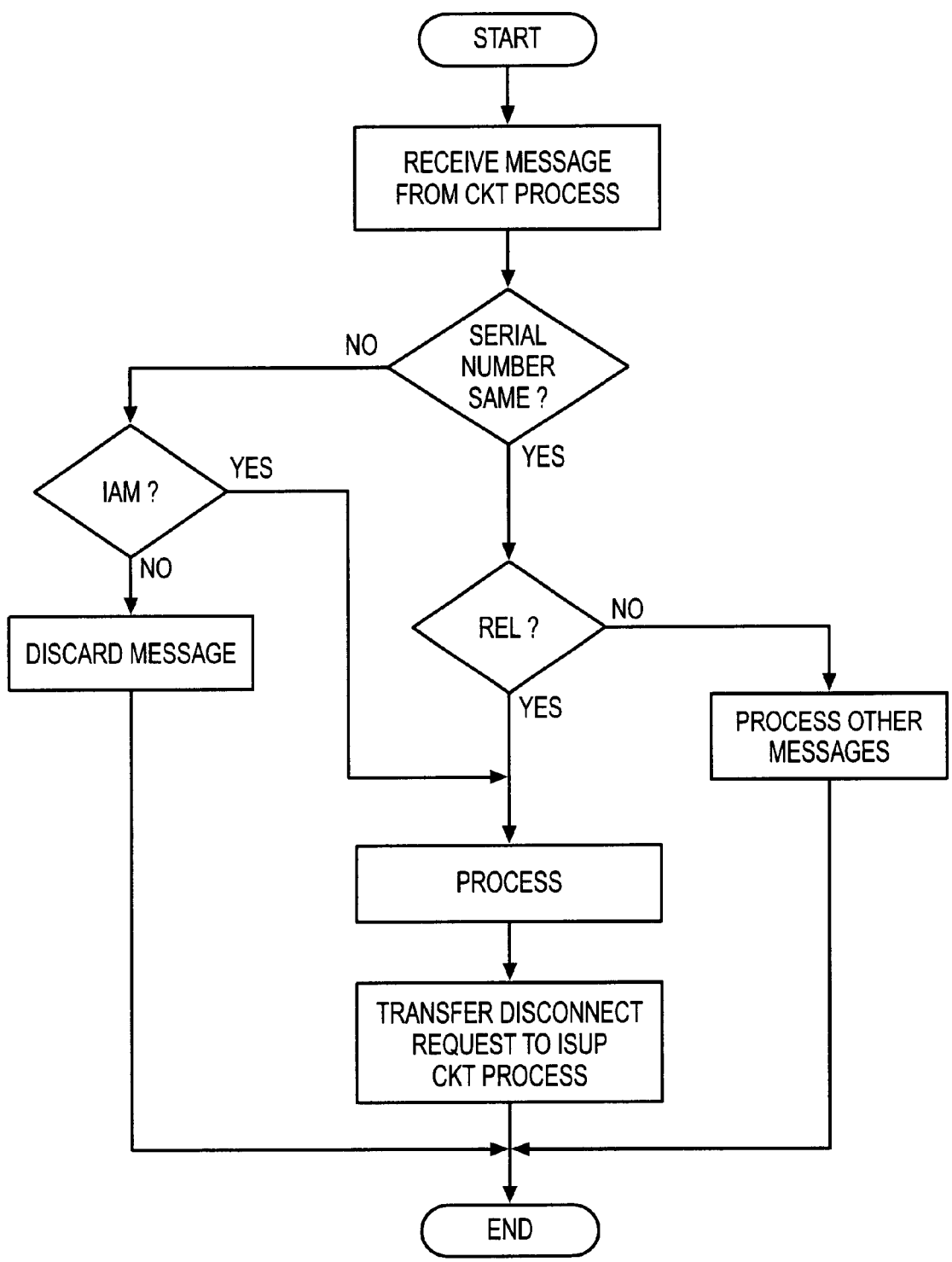
FIG. 6 is a flow chart that depicts the operation of the call process in an example of the invention.

FIG. 6 depicts the operation of the call process 314 when processing the call related messages from the circuit process 312. The call process 314 receives the call related message from the circuit process 312. If the serial number in the message is different than the serial number in the last message from the circuit process 312, and if the message is not an IAM, then the call process 314 discards the message. The call process 314 processes the message it is an IAM. If the serial number is the same, and the message is an REL, then the call process 314 transfers a disconnect request to the circuit process 312. If the serial number is the same, and the message is not an REL, then the call process 314 processes the message.

Figure 7:
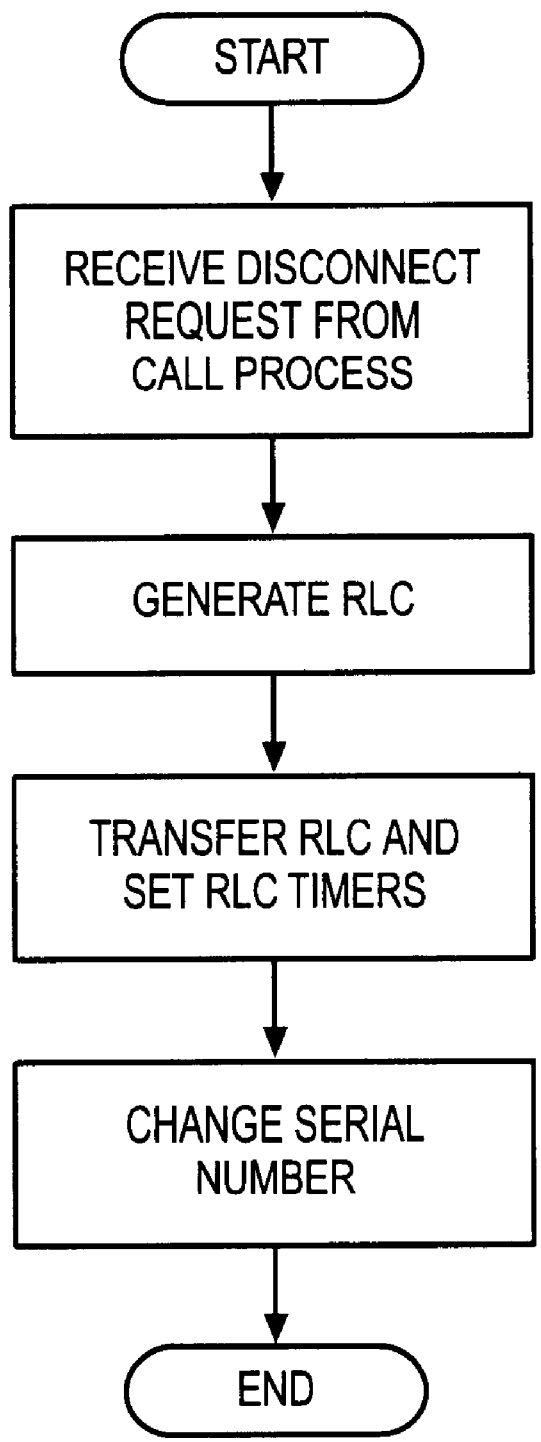
FIG. 7 is a flow chart that depicts the operation of the originating circuit process in an example of the invention.

FIG. 7 depicts the operation of the circuit process 312 when processing the disconnect request from the call process 114. The circuit process 312 receives the disconnect request from the call process 314. In response to the disconnect request, the circuit process 312 generates and transfers an RLC. The circuit process 312 also sets the RLC timers and changes the serial number.

Advantageously, the circuit process 312 off-loads RLC processing from the call process 314 to give the call process 314 additional capacity to handle calls. The circuit process 312 and the call process 314 also use a serial number to avoid race conditions.

Figure 8:
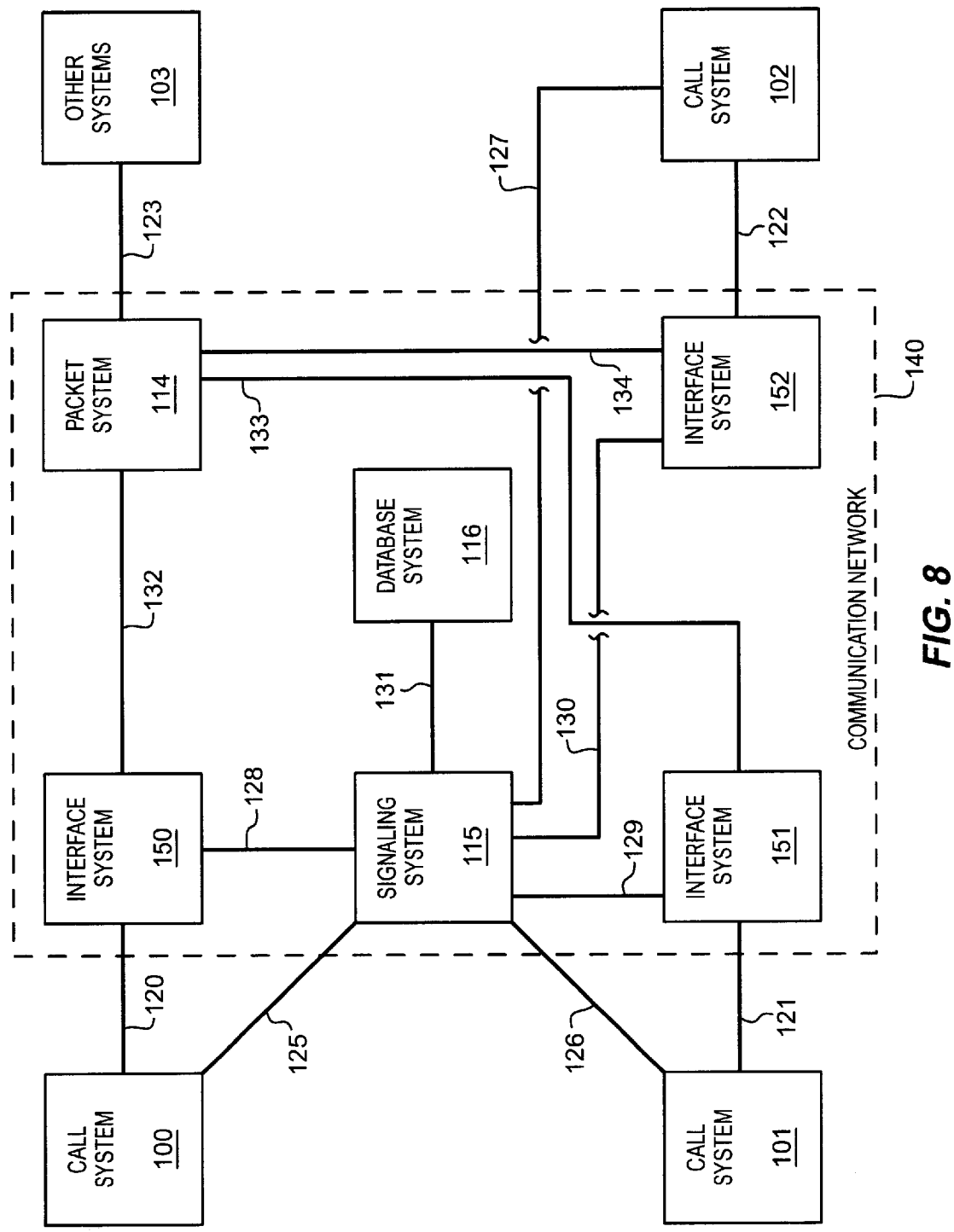
FIG. 8 is a block diagram that depicts a communication network and operating environment in an example of the invention.

Communication Network Architecture and Operation—FIG. 8

Figure 9:
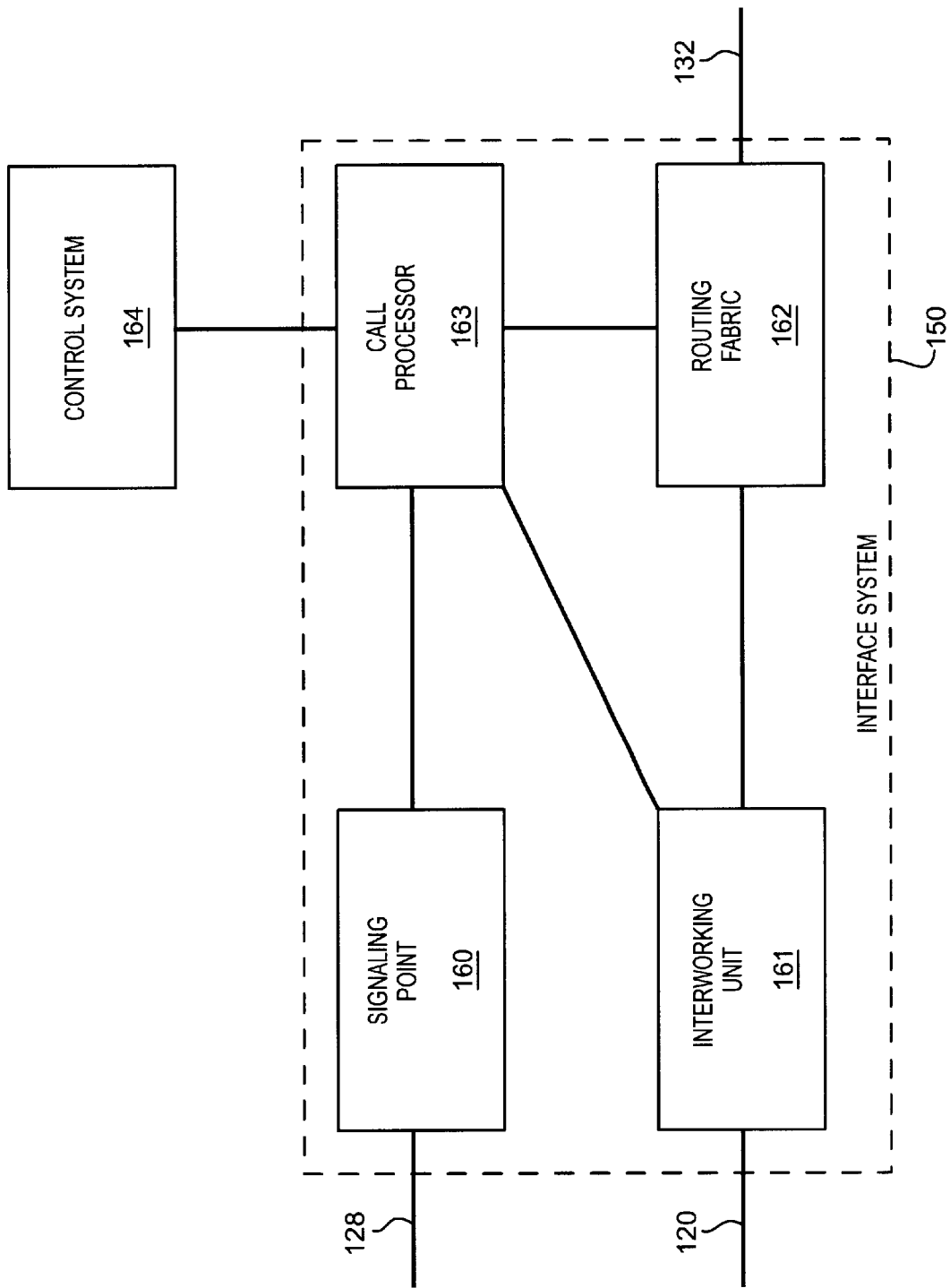
FIG. 9 is a block diagram that depicts a communication interface system in an example of the invention.
Figure 10:
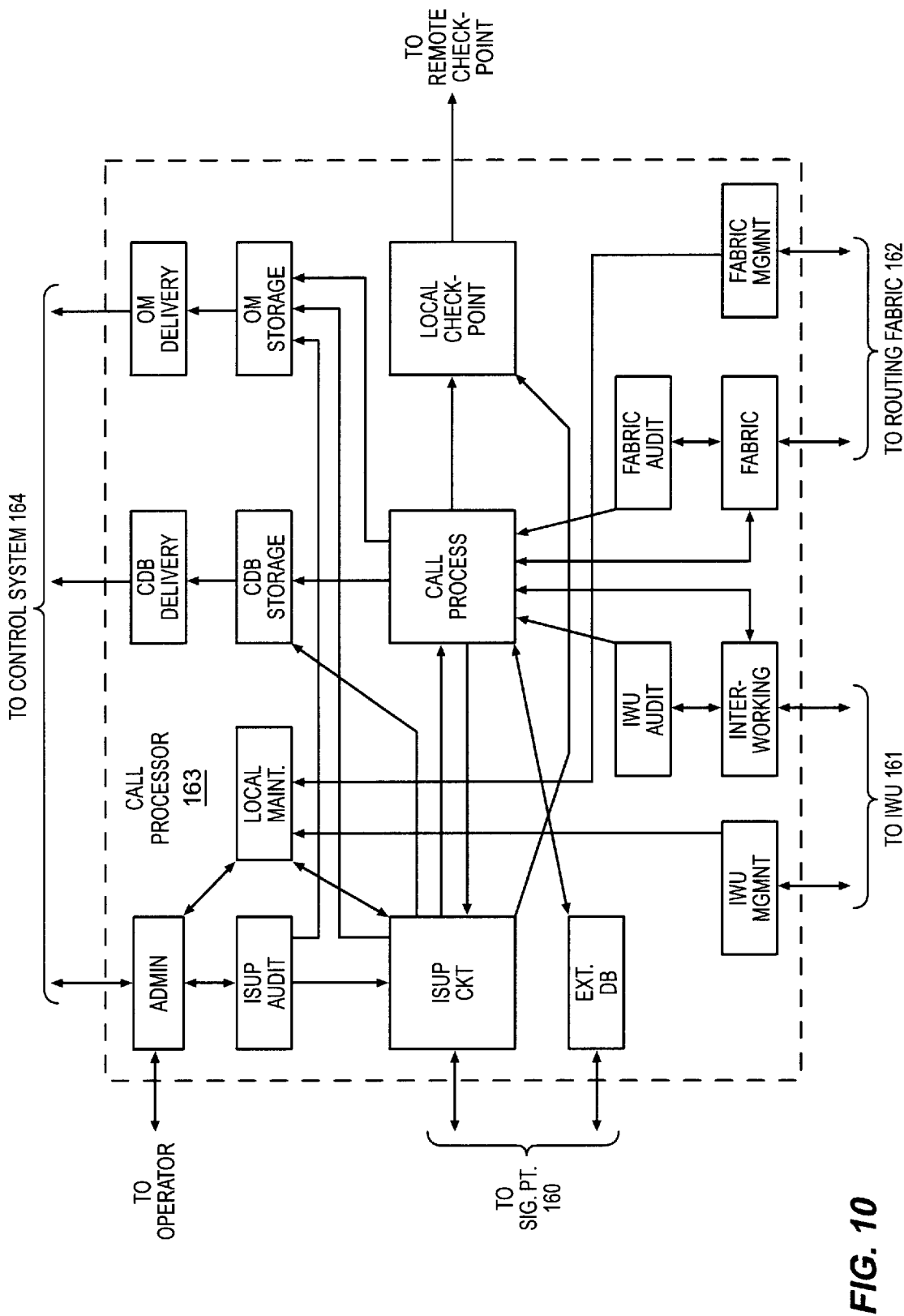
FIG. 10 is a block diagram that depicts a call processor in an example of the invention.

FIGS. 8–10 depict a specific example of a communication network with interface systems in accord with the present invention. Those skilled in the art will appreciate numerous variations from this example that do not depart from the scope of the invention. Those skilled in the art will also appreciate that various features described below could be combined with the above-described embodiment to form multiple variations of the invention.

FIG. 8 depicts a communication network 140 connected to call systems 100–102 and to other systems 103. The communication network 140 is comprised of interface systems 150–152, the packet system 114, the signaling system 115, and database system 116. The signaling system 115 and the call systems 100–102 exchange signaling respectively over links 125–127. The signaling system 115 and the interface systems 150–152 exchange signaling respectively over links 128–130. The signaling system 115 and the database system 116 exchange signaling over link 131. The call systems 100–102 and the interface systems 150–152 exchange user communications respectively over communication paths 120–122. The interface systems 150–152 and the packet system 114 exchange the user communications respectively over communication paths 132–134. The packet system 114 and the other systems 103 exchange the user communications over communication path 123.

To set-up a call from the call system 100 to the call system 102, the call system 100 transfers an IAM to the interface system 150 using the signaling system 115 and links 125, 128. The interface system 150 processes the called number in the IAM to select a route to the call system 102. If needed to process the call, the interface system obtains information from the database system 116 using the signaling system 115 and links 128, 131. The interface system 150 transfers an IAM to interface system 152 using the signaling system 115 and links 128, 130. The interface system 152 transfers an IAM to the call system 102 using the signaling system 115 and links 130, 127. When the called party is being alerted, the call system 102 transfers an ACM to the interface system 152 using the signaling system 115 and links 127, 130. The interface system 152 transfers the ACM to the interface system 150 using the signaling system 115 and links 130, 128. The interface system 150 transfers the ACM to the call system 100 using the signaling system 115 and links 128, 125. When the called party answers, the call system 102 transfers an ANM to the interface system 152 using the signaling system 115 and links 127, 130. The interface system 152 transfers the ANM to the interface system 150 using the signaling system 115 and links 130, 128. The interface system 150 transfers the ANM to the call system 100 using the signaling system 115 and links 128, 125. In response to the ANM, the interface systems 150 and 152 transfer user communications between call systems 100 and 102 through the packet system 114 over communication paths 120, 132, 134, and 122. A call from the user system 100 to the other systems 103 could be established in a similar fashion by omitting the signaling exchanged with the terminating end, although some other form of signaling may be used. To end the call, the call system 100 transfers an REL to the interface system 150 using the signaling system 115 and links 125, 128. The interface system 150 transfers an RLC to the call system 100 using the signaling system 115 and links 128, 125. The interface system 150 transfers an REL to interface system 152 using the signaling system 115 and links 128, 130. The interface system 152 transfers an REL to the call system 102 using the signaling system 115 and links 130, 127. Aside from the interface systems 150–152, the configuration and operation of these systems, links, and communication paths could be conventional.

FIG. 9 depicts the interface system 150 coupled to a control system 164. The interface system 150 is comprised of signaling point 160, interworking unit 161, routing fabric 162, and call processor, 163. A system that could be modified to the interface system 150 is described in U.S. patent application entitled "System and Method for Processing a Call," filed on Nov. 5, 1999, which is hereby incorporated by reference and assigned to the assignee of the present invention.

The signaling point 160 provides conventional SS7 Message Transfer Part (MTP) functionality for the call processor 163. The signaling point 160 exchanges signaling with the link 128 using Message Signal Units (MSUs). The signaling point 160 exchanges signaling content with the call processor 163 using UDP/IP envelopes. To transfer signaling to the call processor 163, the signaling point 160 receives MSUs, strips away the MSU envelopes, and encapsulates the signaling content in UDP/IP envelopes. In the context of the invention, the term "signaling" includes the signaling content processed by the call processor 163.

The interworking unit 161 converts the user communications between the different protocols used on the communication paths 120 and 132. Typically, the interworking unit 161 converts TDM user communications on communication path 120 with packet-based user communications on communication path 132. The interworking unit 162 performs the conversions in response to control signals from the call processor 163. In some examples of the invention, the control signals instruct the interworking unit 161 to interwork a specific TDM DS0 with a specific ATM address, in addition to implementing any required echo cancellation.

The routing fabric 162 exchanges packets carrying the user communications with the interworking unit 161. The routing fabric 162 routes the packets over the communication path 132. The communication path 132 may be a single physical connection, but it typically includes multiple physical connections. The routing fabric 162 may also modify the addresses in the packets. The routing fabric 162 performs the routing in response to control signals from the call processor 163.

The call processor 163 exchanges signaling with the signaling point 160. The call processor 163 processes the signaling to provide control instructions to the interworking unit 161 and the routing fabric 162. The call processor 162 provides billing and operational information to the control system 164. The control system 164 provides call-routing data and configuration information to the call processor 163.

FIG. 10 depicts the call processor 163. The call processor 163 includes processes to set-up and tear down calls using remote database access if necessary. The call processor 163 includes processes to track circuit and resource status, perform audits, and provide billing and operational information. The call processor also includes processes to store information needed to recover from a crash.

The Integrated Services User Part (ISUP) circuit process exchanges signaling with the call system 100 and interfaces 151–152 using the signaling point 160. The ISUP circuit processes maintenance messages and passes call-related messages, except for RLCs, to the call process. The ISUP circuit process is assigned to handle signaling related to a set of communication path circuits. For a call, there is an originating ISUP circuit process for the communications path into the interface 150, and a terminating ISUP circuit process for the communications path out of the interface 150. Depending on the assignments, the originating and terminating ISUP circuit processes may be the same or different.

The call process communicates with the originating and terminating ISUP circuit processes to handle call-related messages. The call process accesses routing tables to select a route for the call. The call process communicates with the interworking process and the fabric process to respectively control the interworking unit 161 and the routing fabric 162. The call process communicates with the external data base process to access the database system through the signaling point 160. The call process communicates with the Call Detail Block (CDB) storage and delivery processes to provide billing information to the control system 160. The call process communicates with the Operational Measurement (OM) storage and delivery processes to provide operational information to the control system 160.

The routing fabric process provides an interface to the routing fabric 162. The routing fabric process tracks the instructions sent to the routing fabric 162 and re-sends or generates alarms if timers expire without acknowledgment from the routing fabric 162. The interworking unit process provides an interface to the interworking unit 161. The interworking unit process tracks the instructions sent to the interworking unit 161 and resends or generates alarms based if timers expire without acknowledgment from the interworking unit 161. For continuity testing, the call processes requests the test, and then receives the test result. The interworking unit 161 handles the actual test without additional instructions.

The local maintenance process communicates with the administrative process, the interworking unit management process, and the fabric management process to receive requests for circuit maintenance messages. The local maintenance process forwards the requests to the appropriate ISUP circuit process. The local checkpoint process receives checkpoint messages from the ISUP circuit and call processes. The checkpoint messages contain information used to maintain on-going calls if a crash occurs. The local checkpoint process stores the checkpoint messages in non-volatile storage, and makes the data available to a redundant call processor in the event of a crash.

The ISUP audit process requests circuit status from neighboring systems through the ISUP circuit process. The ISUP audit process compares the results to local data and reports discrepancies for resolution. The interworking unit audit process requests circuit status from the interworking unit 161 through the interworking unit process. The interworking unit audit process compares the results to local data and reports discrepancies for resolution. Typically, the interworking unit audit process only checks the status of idle circuits. The routing fabric audit process requests circuit status from the routing fabric 162 through the routing fabric process. The routing fabric audit process compares the results to local data and reports discrepancies for resolution. Typically, the routing fabric audit process only checks the status of idle circuits.

The interworking management process handles status messages from the interworking unit 161 received through the interworking unit process. The status messages indicate the availability of resources at the interworking unit 161. The interworking unit management process notifies the local maintenance of status updates. The routing fabric management process handles status messages from the routing fabric 162. These messages are received directly from the routing fabric 162 using SNMP or CMIP. The status messages indicate the availability of resources at the routing fabric 162. The routing fabric management process notifies the local maintenance of status updates.

The CDB storage process stores CDB data from the call process and ISUP circuit process to non-volatile storage. The CDB delivery process provide the CDB data to the control system 164. The OM storage process stores OM data from the call process and ISUP circuit process to non-volatile storage. The OM delivery process provides the OM data to the control system 164. Although not shown, similar storage and delivery processes are typically included for logs and alarms.

The above-described processes are comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method for operating a communications interface system, the method comprising:

receiving an initial address message for a call into a circuit process and transferring the initial address message to a call process;

processing the initial address message with the call process to generate set-up information and transferring the set-up information to a bearer system;

receiving user communications for the call into the bearer system and routing the user communications in response to the set-up information;

receiving a release message for a call into the circuit process and transferring the release message to the call process;

processing the release message with the call process to generate tear-down information and a disconnect message, transferring the tear-down information from the call process to the bearer system, and transferring the disconnect message from the call process to the circuit process;

generating a release complete message in the circuit process in response to the disconnect message and transferring the release complete message; and terminating the routing of the user communications in the bearer system in response to the tear-down information.

2. The method of claim 1 wherein processing the initial address message with the circuit process further comprises stamping the initial address message with a serial number;

processing the release message with the circuit process further comprises stamping the release message with the serial number; and processing the release message with the call process further comprises checking the serial number in the release message for a match with the initial address message.

3. The method of claim 2 wherein generating and transferring the release complete message with the circuit process further comprises changing the serial number.

4. The method of claim 1 wherein generating and transferring the release complete message with the circuit process further comprises setting a timer.

5. The method of claim 4 further comprising receiving another release complete message for the call into the circuit process and stopping the timer without transferring the other release complete message to the call process.

6. The method of claim 1 further comprising receiving and handling circuit maintenance signaling messages with the circuit process.

7. The method of claim 1 wherein receiving the user communications for the call into the bearer system and routing the user communications in response to the set-up information comprises receiving the user communications into an interworking unit and converting the user communications from one protocol to another in response to the control signals.

8. A communications interface system comprising:
- a call processor comprising a circuit process and a call process, wherein the circuit process is configured to receive an initial address message and a release message for a call and transfer the initial address message and the release message to the call process and to generate and transfer a release complete message in response to a disconnect message, and the call process is configured to process the initial address message to generate and transfer set-up information and to process the release message to generate and transfer tear-down information and the disconnect message; and
- a bearer system configured to receive the set-up information and user communications for the call, to route the user communications in response to the set-up information, and to terminate the routing of the user communications in response to the tear-down information.

9. The communications interface system of claim 8 wherein the circuit process is configured to stamp the initial address message and the release message with a serial number, and the call process is configured to check the serial number in the release message for a match with the initial address message.

10. The communications interface system of claim 9 wherein the circuit process is configured to change the serial number in response to the release complete message.

11. The communications interface system of claim 8 wherein the circuit process is configured to set a timer for the release complete message.

12. The communications interface system of claim 11 wherein the circuit process is configured to receive another release complete message for the call and to stop the timer without transferring the other release complete message to the call process.

13. The communications interface system of claim 8 wherein the circuit process is configured to receive and handle circuit maintenance signaling messages.

14. The communications interface system of claim 8 wherein the bearer system comprises an interworking unit configured to convert the user communications from one protocol to another in response to the control signals.

* * * * *